United States Patent
Keskar (10) Patent No.: US 11,526,561 B2
(45) Date of Patent: Dec. 13, 2022

(54) SYSTEM AND METHOD FOR DETERMINING TEMPORAL CITATION COUNT

(71) Applicant: Innoplexus AG, Eschbom (DE)

(72) Inventor: Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 421 days.

(21) Appl. No.: 16/583,922

(22) Filed: Sep. 26, 2019

(65) Prior Publication Data
US 2020/0104325 A1 Apr. 2, 2020

Related U.S. Application Data

(60) Provisional application No. 62/737,289, filed on Sep. 27, 2018.

(51) Int. Cl.
*G06F 16/93* (2019.01)
*G06N 3/08* (2006.01)

(52) U.S. Cl.
CPC ............. *G06F 16/93* (2019.01); *G06N 3/084* (2013.01)

(58) Field of Classification Search
CPC ........ G06N 3/084; G06N 20/00; G06F 16/93; G06F 16/21; G06F 16/211
See application file for complete search history.

(56) References Cited

U.S. PATENT DOCUMENTS

2017/0228445 A1* 8/2017 Chiu ...................... G06Q 50/01

* cited by examiner

*Primary Examiner* — Hau H Hoang
(74) *Attorney, Agent, or Firm* — Ziegler IP Law Group, LLC (57) ABSTRACT

Disclosed is a system for determining a temporal citation count for a document associated with an author, wherein the system comprises a database arrangement storing metadata related to the document, and a server arrangement communicably coupled to the database arrangement, wherein the server arrangement receives the metadata associated and employs dimensionality reduction techniques on the metadata to obtain a state data; designates the author of the document as a source node in the entity network comprising information related to a plurality of authors and citation history between the plurality of authors, wherein the remaining authors in the plurality of authors are designated as destination nodes determines an edge weight for edge between any of the source node and the destination nodes based on the state data; and aggregates the edge weight for the edges to obtain the temporal citation count.

17 Claims, 3 Drawing Sheets

FIG. 4

# SYSTEM AND METHOD FOR DETERMINING TEMPORAL CITATION COUNT

CROSS REFERENCE TO RELATED APPLICATIONS

This application claims priority to U.S. Provisional Patent Application No. 62/737,289 filed Sep. 27, 2018, which is hereby incorporated by reference in its entirety.

TECHNICAL FIELD

The present disclosure relates generally to systems and methods for data analysis and processing. Furthermore, the present disclosure also relates to systems for determining a temporal citation count for a document associated with an author; and to methods for determining a temporal citation count for a document associated with an author.

BACKGROUND

In past few decades, mankind has seen exponential development in every field of life such as technical, literature, arts and the like. Such development is assisted with numerous studies, researches and experiments. Furthermore, such studies, researches and experiments require information and data. Earlier, information and data used to be stored in papers, journals, books and so forth. Furthermore, with technological advancement information and data required for studies, researches and experiments are stored in digital form. In addition, digital data required for studies, researches and experiments is stored on online data stores such as websites, online journals, research papers and the like. Furthermore, as development in a given domain progresses, some of the digital data associated with a given domain may become obsolete and useless with time.

Earlier, a user having digital data associated with the given domain had no trustworthy means to predict future usefulness of the digital data. Therefore, the user had to store all of the digital data therewith for an undefined period of time. Notably, such necessity of storing all of the digital data used to waste a lot of storage space, time and effort of the user.

Presently, the user having the digital data associated with the given domain uses currently available techniques for predicting future usefulness of the digital data. The currently available techniques observe available information associated with usefulness of the digital data associated with the given domain. Subsequently, the currently available techniques provide data associated with usefulness of the digital data for a given period of time. However, the currently available techniques suffer from certain performance issues.

The currently available techniques predict usefulness of the digital data based on available information regarding usefulness of the digital data. Therefore, the currently available techniques are unable to predict usefulness of a new digital data. Furthermore, the currently available techniques do not take intrinsic features related to the digital data into consideration such intrinsic features include metadata related to the digital data such as author, publication date and the like. Moreover, prediction of usefulness of the digital data provided by the currently available techniques is prone to error and cannot be trusted without taking a risk.

Therefore, in light of the foregoing discussion, there exists a need to overcome the aforementioned drawbacks associated with the currently available techniques of predicting usefulness of the digital data.

SUMMARY

The present disclosure seeks to provide a solution to existing problem of uncertain and unpredictable future of the document associated with an author. The present invention also seeks to provide a way for predicting future citations, references associated with the document. Furthermore, the present invention allows a user to determine usefulness of the document without reading content or metadata associated with the document. In addition, the invention disclosed herein enables the user to decide price of the document for buying or selling, a rank of the document based on usefulness thereof and making decision for buying or selling of the document.

In one aspect, an embodiment of the present disclosure provides a system for predicting a temporal citation count for a document associated with an author, wherein the system comprises a database arrangement storing metadata related to the document, and a server arrangement communicably coupled to the database arrangement, wherein the server arrangement:
  receives the metadata associated with the document;
  employs dimensionality reduction techniques on the metadata associated with the document to obtain a state data;
  designates the author of the document as a source node in the entity network comprising information related to a plurality of authors and citation history between the plurality of authors, wherein the remaining authors in the plurality of authors are designated as destination nodes;
  determines an edge weight for edge between any of the source node and the destination nodes based on the state data and any of the source and destination nodes associated therewith; and
  aggregates the edge weight for the edge between any of the source node and the destination nodes to obtain the temporal citation count associated with the published document.

In another aspect, an embodiment of the present disclosure provides a method of determining a temporal citation count for a document associated with an author, the method comprises:
  receiving a metadata associated with the document, wherein the metadata associated with the document is stored in a database arrangement;
  employing dimensionality reduction techniques on the metadata associated with the document to obtain a state data;
  designating the author of the document as a source node in an entity network comprising information related to a plurality of authors and citation history between the plurality of authors, wherein the remaining authors in the plurality of authors as destination nodes;
  determining an edge weight for edge between any of the source node and the destination nodes based on the state data and any of the source and destination nodes associated therewith; and
  aggregating the edge weight for the edge between any of the source node and the destination nodes to obtain the temporal citation count associated with the published document.

Embodiments of the present disclosure substantially eliminate or at least partially address the aforementioned problems in the prior art, and enable a system and method of creating database arrangement in a structured manner that allows for determination of relevance of a document using an index.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for determining a temporal citation count for a document associated with an author, wherein the system comprises a database arrangement storing metadata related to the document, and a server arrangement communicably coupled to the database arrangement, wherein the server arrangement:

receives the metadata associated with the document;

employs dimensionality reduction techniques on the metadata associated with the document to obtain a state data;

designates the author of the document as a source node in the entity network comprising information related to a plurality of authors and citation history between the plurality of authors, wherein the remaining authors in the plurality of authors are designated as destination nodes;

determines an edge weight for edge between any of the source node and the destination nodes based on the state data and any of the source and destination nodes associated therewith; and aggregates the edge weight for the edge between any of the source node and the destination nodes to obtain the temporal citation count associated with the published document.

In another aspect, an embodiment of the present disclosure provides a method of determining a temporal citation count for a document associated with an author, the method comprises:

receiving a metadata associated with the document, wherein the metadata associated with the document is stored in a database arrangement;

employing dimensionality reduction techniques on the metadata associated with the document to obtain a state data;

designating the author of the document as a source node in an entity network comprising information related to a plurality of authors and citation history between the plurality of authors, wherein the remaining authors in the plurality of authors as destination nodes;

determining an edge weight for edge between any of the source node and the destination nodes based on the state data and any of the source and destination nodes associated therewith; and aggregating the edge weight for the edge between any of the source node and the destination nodes to obtain the temporal citation count associated with the published document.

The invention disclosed herein provides an efficient, effective and seamless way of predicting usefulness of a document associated with an author. Notably, predicting usefulness, citations and future relevance of the document allows a user for estimating present and future usefulness and scope of the document. Therefore, the present disclosure provides a way for foreseeing future importance of the document so that the user may decide on buying, selling, modifying or storing the document. Moreover, system disclosed herein allows the user for verifying and authenticating a reliability of the document. Additionally, method disclosed herein reduces time, effort and cost spent by the user in researching regarding usefulness of the document. Furthermore, the system and method disclosed herein is modular and platform independent. Notably, the present invention can be implemented with existing hardware components.

Disclosed herein is the system for determining the temporal citation count for the document associated with the author. The system refers to a combination of hardware, software, firmware or a combination thereof that, in operation, performs a plurality of operation to predict a citation count with respect to time such as days, weeks, months, years, decades and so forth. Furthermore, the "temporal citation count" as mentioned herein relates to citations, mentions and referrals of the document in one or more other documents with respect to time. In addition, the temporal citation count for the document determines a future usefulness, credibility and relevance of the document. In addition, the author of the document is a person, organization, institute and the like who is a writer, an owner or having ownership rights on the document.

Moreover, the system comprises the database arrangement storing metadata related to the document. The database arrangement relates to an organized body of digital information namely, the document and the metadata related thereto, regardless of a manner in which the document or the metadata related thereto is represented. Optionally, the database arrangement is a hardware, software, firmware and/or any combination thereof. For example, the metadata related to the document is represented in form of a table, a map, a grid, a packet, a datagram, a file, a document, a list or in any other form. The database arrangement includes any data storage software and systems, such as, for example, a relational database like IBM DB2 and Oracle 9. Furthermore, the database arrangement refers to the software program for creating and managing one or more databases. Optionally, the database arrangement supports relational operations, regardless of whether it enforces strict adherence to a relational database model, as understood by those of ordinary skill in the art. Additionally, the database arrangement populated by data elements. Furthermore, the data elements may include data records, bits of data, cells, are used interchangeably herein and all intended to mean information stored in cells of a database, wherein the data elements are related to the document and the metadata related to the document. Furthermore, the metadata related to the document relates to information associated with the document. Such information includes title of the document, keywords in the document, abstract of the document, domain name of the document, author(s) of the document, publication date of the document, conference/journal name related with the document and the like. Notably, the metadata includes the document and information related to the document, wherein such information is included in the document. Additionally, optionally, the metadata includes information that is not included in the document.

Optionally, the metadata related to the document includes: title of the document, abstract of the document, domain of the document, keywords associated with the document, date of publication, author name(s), information associated with past work of the authors of the document, wherein information associated with past work of the authors of the documents includes: title of other publications related to the authors, other citations associated with the authors, publications related with the authors and so forth. The metadata includes information associated with the document, such information identifies a domain, context of the document. Additionally, the metadata includes information associated with the document that is used to uniquely identify the document.

Furthermore, the system includes the server arrangement communicably coupled to the database arrangement. Throughout the present disclosure, the term "server arrangement" relates to a structure and/or module that include programmable and/or non-programmable components configured to store, process and/or share information. Optionally, the server arrangement includes any arrangement of physical or virtual computational entities capable of enhancing information to perform various computational tasks.

Furthermore, it should be appreciated that the server arrangement may be both single hardware server and/or plurality of hardware servers operating in a parallel or distributed architecture. In an example, the server arrangement includes components such as memory, a processor, a network adapter and the like, to store, process and/or share information with other computing components, such as user device/user equipment. Optionally, the server arrangement is implemented as a computer program that provides various services (such as database service) to other devices, modules or apparatus. Moreover, the communicable coupling between the server arrangement and the database arrangement is achieved via a communication module.

The communication module relates to an arrangement of interconnected programmable and/or non-programmable components that are configured to facilitate data communication between one or more electronic devices and/or database arrangement. Furthermore, the communication module may include, but is not limited to, one or more peer-to-peer network, a hybrid peer-to-peer network, local area networks (LANs), radio access networks (RANs), metropolitan area networks (MANs), wide area networks (WANs), all or a portion of a public network such as the global computer network known as the Internet, a private network, a cellular network and any other communication system or systems at one or more locations. Additionally, the communication module includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed with in the communication module. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols.

Furthermore, the server arrangement receives the metadata associated with the document. Notably the metadata is stored in the database arrangement and the server arrangement receives the metadata therefrom. In an instance, the metadata is provided to the server arrangement by a user associated with the user-device. In another instance, the server arrangement is configured to retrieve the metadata by accessing the database arrangement. Notably, the metadata associated with the document enables the server arrangement to determine various aspects related thereto, wherein such aspects include domain of the document, author of the document and so forth.

Moreover, the server arrangement employs dimensionality reduction techniques on the metadata associated with the document to obtain the state data. Notably, the metadata associated with the document is complicated and has high dimension due to large number of features and variables therein. Such high dimension of the metadata leads to difficult and complicated representation of distribution thereof. Therefore, the server arrangement employs the dimensionality reduction technique in order to reduce dimension of the metadata in order to simplify representation of distribution thereof. The dimensionality reduction techniques reduce a number of random variables in the metadata by obtaining a set of useful variables. Notably, such reduction of dimensionality is achieved by performing feature selection and feature extraction from the metadata associated with the document. Beneficially, reducing dimension of the metadata reduces space required to store the metadata, reduces computation time of operations performed over the metadata, simplification of various operational steps, and easy visualization of metadata by allowing plotting and observing patterns of metadata more clearly. Examples of dimensionality reduction techniques include missing value ratio, low variance filter, Random forest, high correlation filter, backward feature elimination, forward feature selection, factor analysis, principal component analysis, independent component analysis, methods based on projections, t-distribute stochastic neighbor embedding (t-SNE) and so forth. Furthermore, the state data obtained by the employing the dimensionality reduction techniques is used to provide to the entity network an initial state thereof and interconnection between nodes thereof.

Optionally, the dimensionality reduction techniques are executed via an autoencoder module, wherein the autoencoder module is trained using a variational inference algorithm. The autoencoder module is an artificial neural network that is used to learn efficient data coding and patterns in an unsupervised manner. The aim of the autoencoder module is to determine a representation for the metadata for reducing dimensions of the metadata by way of feature selection, feature extraction and ignoring signal noise. Moreover, the autoencoder module is trained for performing such dimensionality reduction of the metadata. The variational inference algorithm, that is employed to train the autoencoder module, is a set of methods that makes computations on the metadata tractable. Beneficially, the autoencoder trained with the variational inference algorithm is used to compute the state data having a reduced dimension that is easier to be processed further by the server arrangement. In addition, reducing the dimension of the metadata to obtain the state data also reduces CPU-time required for further processing for determining the temporal citation count of the publication.

Moreover, the server arrangement designates the author of the document as the source node in the entity network comprising information related to the plurality of authors and citation history between the plurality of authors. The entity network relates to a network of the plurality of authors based on citations therebetween. The plurality of authors have a citation history associated therewith. In other words, each of the plurality of authors have cited one or more of the plurality of authors in one or more documents associated therewith. Furthermore, the entity network represents a distribution of authors based on the citation history associated therewith. Notably, each of the plurality of authors within the entity network have a location (namely, co-ordinate), within the network, associated therewith, wherein the location is determined based upon the citation history associated with each of the plurality of authors. It is to be understood that the location associated with each of the plurality of authors relates to author's embedding within the network. Beneficially, the author's embedding is used by the server arrangement to optimize the temporal citation count.

Optionally, the location of each of the authors, within entity network, is initialized as a random variable and is further optimized based on the citation history associated therewith.

Moreover, optionally, each of the authors have a plurality of locations associated therewith. In addition, each of the plurality of locations associated with a given author has a probability associated therewith. Furthermore, the entity network has a plurality of representations thereof based upon the probability associated with each of the plurality of locations associated with the given author within the entity network.

In an example, an entity network includes nodes $V_i$, $V_j$ and $V_k$, wherein node $V_k$ is adjacent to nodes $V_i$, $V_j$ that are connected by an edge therebetween. In addition, $V_k$ has an edge associated with $V_i$, $V_j$ respectively. Furthermore, each of the nodes $V_i$, $V_j$ and $V_k$ have a plurality of locations associated therewith, wherein the plurality of location associated with each of the nodes $V_i$, $V_j$ and $V_k$ have a probability of occurrence associated therewith. The plurality of locations associated with each of the nodes $V_i$, $V_j$ and $V_k$ provide author's embedding therefor. Furthermore, each of the plurality of location associated with each of the nodes $V_i$, $V_j$ and $V_k$ provide a distinct representation of the entity network.

Furthermore, in the entity network, a first author in the plurality of authors citing a second author in the plurality of authors have a directed edge therebetween from the first author to the second author. In a first example, a given author A who has cited another author B has a directed edge therebetween from the author A to author B. Notably, an initial state of the entity network is determined by the server arrangement, wherein the server arrangement determines the initial state based upon the state data determined by applying dimensionality reduction techniques on the metadata. The initial state of the entity network refers to representation of the entity network and presence or absence of edge between any two of the plurality of authors. Furthermore, the author associated with the document is appointed as the source node of the document. In other words, the author of the document associated with the metadata for which the temporal citation count is to be determined is designated (namely, appointed) as the source node in the entity network. In addition, the remaining authors in the plurality of authors are designated as destination nodes. In other words, the remaining authors in the plurality of authors who have cited the document in their work such as publication, experiment, seminar and the like are designated as the destination node in the entity network. The number of edges between any two authors of the plurality of authors in the entity network specifies number of times one author has cited the other.

In an example, the plurality of authors having a citation history have cited each other's work previously. In addition, the plurality of authors work together in a given lab and cite each other's work in experiments. Furthermore, the plurality of authors are associated with a same domain of research.

Optionally, the entity network is a graph neural network (GNN). The graph neural network models dependencies between nodes in a graph structure. Notably, the graph neural network is a type of neural network which directly operates on the graph structure. The nodes in the graph neural network are labelled and such labelled nodes are operated upon to determine weight of edges between the nodes in the graph structure.

Moreover, the server arrangement determines the edge weight for edge between any of the source node and the destination nodes based on the state data and any of the source and destination nodes associated therewith. Notably, the edge has the edge weight associated therewith, wherein the edge weight denotes citations between associated authors. It will be appreciated that the edge is directed, wherein a given edge from a first author to the second author denotes that the first author has cited the second author once. The state data is used by the server arrangement to set a global state of the entity graph. In addition, determination of edge weight of the edge is also based upon source and destination nodes associated therewith. In other words, determination of edge weight of the edge is based upon the state data and author's embedding of the source node and the destination node associated with the edge. The global state of the entity network relates to initial state of representation of the entity network, wherein the representation of the entity network is presence and/or absence of edge between the nodes, number of edges between the nodes, direction of edges between the nodes, and edge weight associated with the edge.

Optionally, an edge from a source node of a first entity network and another source node of a second entity network exists in an instance when an author associated with the source network of the first entity network cites a document of an author associated with another source node of the second entity network.

Optionally, the server arrangement uses an observed citation data having a temporal value, to update the entity network and distribution of nodes within the entity network. The observed citation data relates to data associated with previous citations of the document by the plurality of authors. In an example, a given author cites one of his own works in his new work. In addition, the observed citation data is associated with a temporal value, wherein the temporal value relates to time in form of weeks, months and years associated with the observed citation data. The observed citation data is processed to determine distribution of the entity network. At a first step, a breadth-first search is performed and the edges are annotated based on the observed citation data. At a second step, a backpropagation is performed for each edge in the entity network. Notably, such backpropagation is used to update the edge weight of edges in the entity network along with distribution of authors within the network depending upon mutual citations therebetween.

Optionally, the entity network and distribution of nodes within the entity network is updated using a backpropagation algorithm. More optionally, the entity network is optimized using message passing protocol and Adam Optimizer Protocol. Notably, the backpropagation algorithm is a method used in artificial neural networks to calculate a gradient that is needed in calculation of edge weights to be used in the network. The observed citation data is embedded in the entity network using the backpropagation algorithm. Furthermore, the entity network is optimized by applying message passing protocol that infuses the observed citation data within the entity network. The backpropagation algorithm updates the entity network by keeping internal edge weights in the entity network fixed. The observed citation data is embedded in the network by starting from the source node and spread using breadth-first search over the destination nodes. At each step, distribution of nodes that is author's embedding within the entity network is updated based upon the observed data. In addition, the Adam Optimizer Protocol is an adaptive learning rate optimization protocol that is used to train the entity network. The Adam Optimizer Protocol computes individual learning rates for different parameters of the entity network. Such parameters include edge weight of the entity network, direction of the edges between the nodes and so forth.

Moreover, the server arrangement aggregates the edge weight for the edge between any of the source node and the destination nodes to obtain the temporal citation count associated with the published document. The server arrangement subsequent to determining edge weight for the edge between any of the source node and the destination nodes, determines a sum of each of the edge weight associated with the edge between any of the source node and the destination nodes in the entity network. The sum of each of the edge weight associated with the edge between any of the source node and the destination nodes is obtained to determine the temporal citation count associated with the document. Notably, the temporal citation count predicts a measure of usefulness, citations, references to be made in temporal period.

Optionally, the temporal value for which the temporal citation count is to be determined is provided by a user of the system. Alternatively, the temporal value is predetermined by the system.

Optionally, the temporal citation count is represented on a citation-time graph, wherein the citation time graph includes a credible interval. The citation-time graph is a two-dimensional graph that shows distribution of citation count as a function of time. The citation-time graph has citation count on one axis and time on the other axis. The temporal citation count represented by the citation-time graph is a Gaussian distribution parameterized by a mean and standard deviation, wherein the mean is the temporal citation count determined by the system. The Gaussian distribution refers to a bell-shaped density curve described by standard deviation thereof. The Gaussian distribution is a continuous probability distribution that determines the credible interval for determining the temporal citation count. The credible interval represents an upper bound and lower bound for the temporal citation count. Notably, the temporal citation count lies between the upper bound and the lower bound within the credible interval.

Optionally, the credible interval is determined using the plurality of representations of the entity network. It is to be understood that the plurality of representations of the entity network is based upon author's embedding associated with each of the plurality of authors within the network. Notably, the probability associated with the plurality of locations associated with each of the plurality of authors provides the credible interval.

Optionally, author's embedding associated with each of the plurality of authors reflect stochasticity within the credible interval. Notably, stochasticity within the credible interval relates to uncertainty related with the temporal citation count prediction. It will be appreciated that smaller the credible interval is more certain is the temporal citation count determined by the system.

In an implementation example, the system determines a temporal citation count for a document namely, a research paper on a network routing technique, wherein the research paper is published in a journal. The database arrangement includes a metadata associate with the research paper, wherein the metadata includes the document, title of the research paper, abstract of the research paper, authors of the research paper, name of the journal, date of publication and so forth. The server arrangement receives the metadata associated with the research paper. Subsequently, the server arrangement employs a dimensionality reduction technique to reduce dimension of the metadata. Furthermore, the server arrangement designates the author of the research paper as a source of an entity network and other authors having a citation history associated with the author of the research paper as the destination nodes in the entity network. Moreover, the server arrangement determines an edge weight for each of the edge between any of the source node and destination nodes. The edge weights obtained by the server arrangement are aggregated to obtain the temporal citation count. In an embodiment of the implementation example, the entity network is updated using observed citation data of "5" years associated with the research paper. Subsequently, the temporal citation count of the research paper is represented using a citation-time graph.

The present disclosure also relates to the method as described above. Various embodiments and variants disclosed above apply mutatis mutandis to the method.

Optionally, the method includes using an observed citation data having a temporal value, to update the entity network and distribution of nodes within the entity network.

Optionally, the method includes updating the entity network and distribution of nodes within the entity network using a backpropagation algorithm.

Optionally, the method includes executing the dimensionality reduction techniques via an autoencoder module, wherein the autoencoder module is trained using a variational inference algorithm.

Optionally, in the method, the metadata related to the document includes: title of the document, abstract of the document, domain of the document, keywords associated with the document, date of publication, authors of the document.

Optionally, in the method, the entity network is a graph neural network.

Optionally, the method includes optimizing the entity network using messaging passing protocol and Adam Optimizer Protocol.

Optionally, the method includes representing the temporal citation count on a citation-time graph. More optionally, the citation time graph includes a credible interval.

DETAILED DESCRIPTION OF THE DRAWINGS

Figure 1:
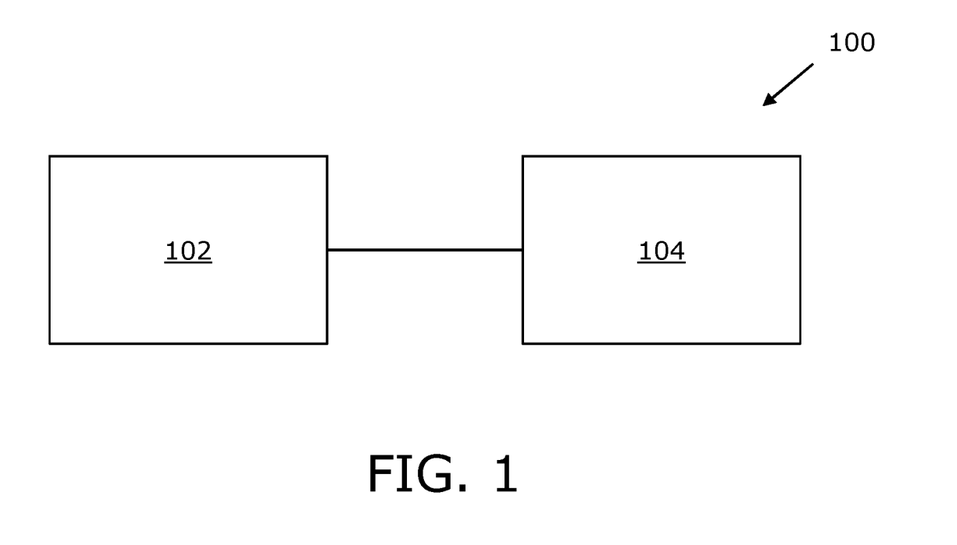
FIG. 1 illustrates a block diagram of a system for determining a temporal citation count for a document associated with an author, in accordance with an embodiment of the present disclosure.

Referring to FIG. 1, illustrated is a block diagram of a system 100 for determining a temporal citation count for a document associated with an author, in accordance with an embodiment of the present disclosure. The system includes a database arrangement 102 storing metadata related to the document, and a server arrangement 104 communicably coupled to the database arrangement 102.

Figure 2:
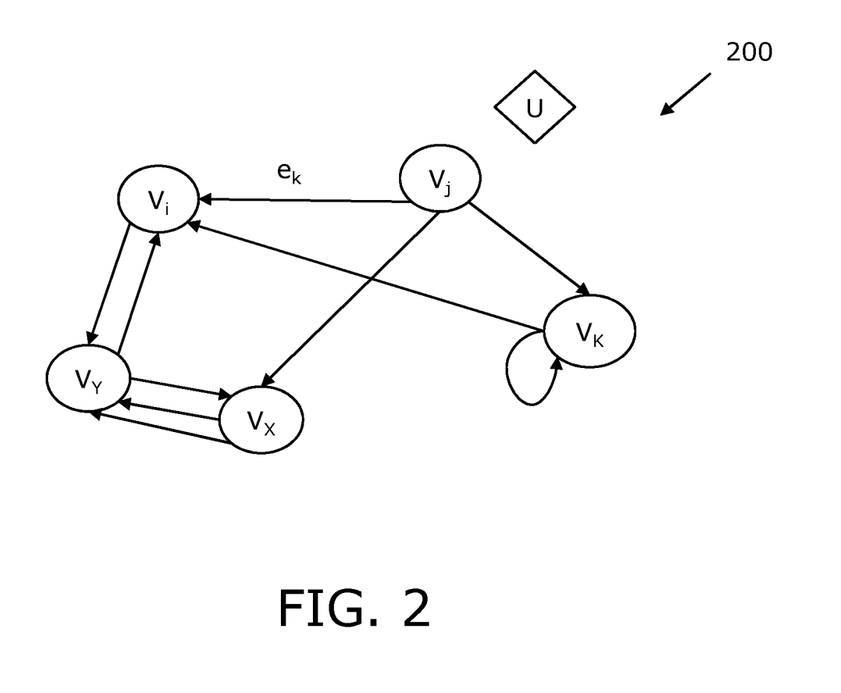
FIG. 2 illustrates a schematic diagram for an entity network of the system of FIG. 1, in accordance with an embodiment of the present disclosure.

Referring to FIG. 2, illustrated is a a schematic diagram 200 for an entity network of the system 100 of FIG. 1, in accordance with an embodiment of the present disclosure. The nodes $V_i$, $V_j$, $V_k$, $V_x$, $V_y$, are a plurality of authors. Furthermore, an edge such as $e_k$ denotes that the author $V_j$ has cited the author $V_k$. Moreover, U is state data associated with the entity network.

Figure 3:
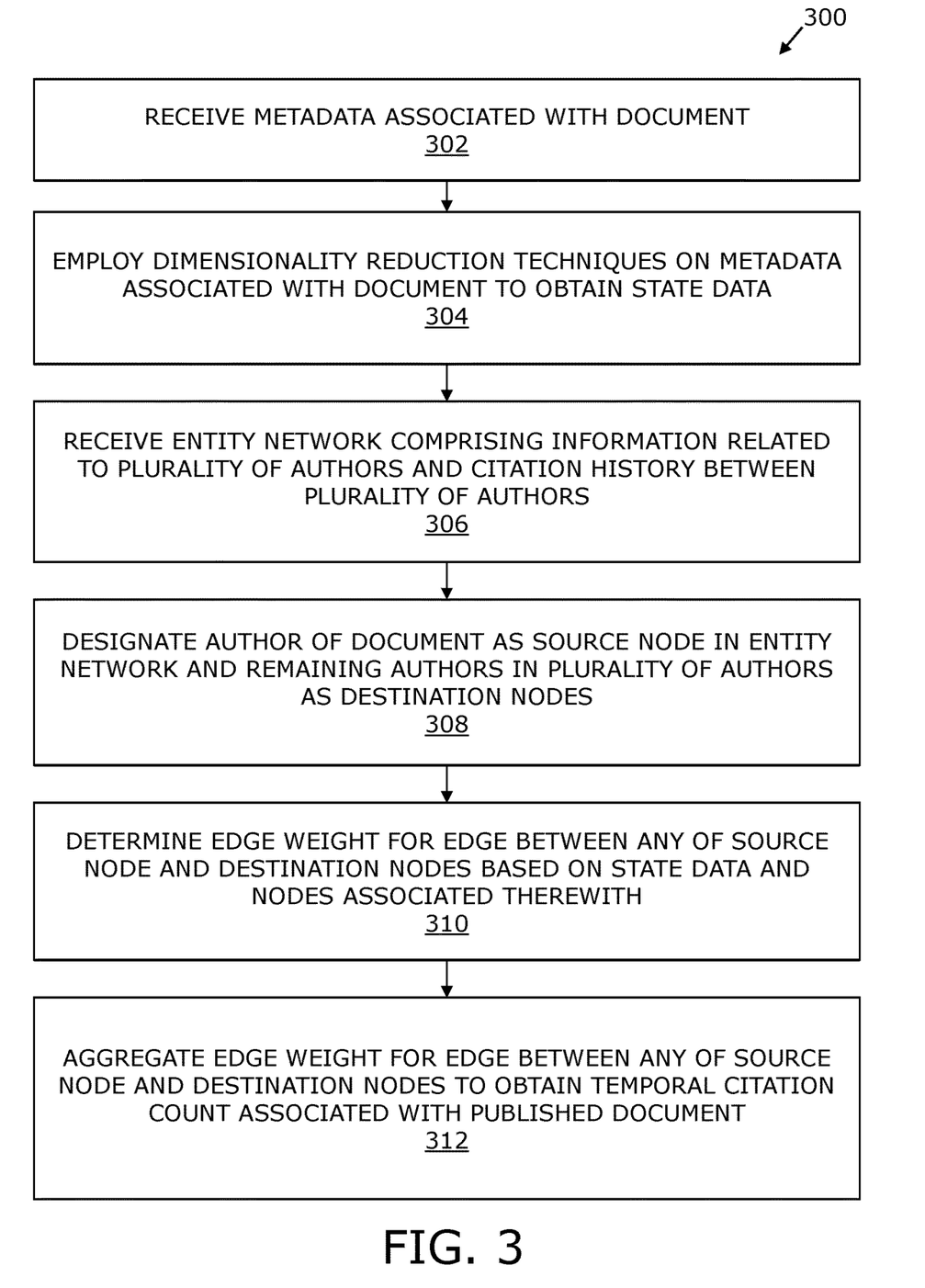
FIG. 3 illustrates a flowchart for method of determining a temporal citation count for a document associated with an author, in accordance with an embodiment of the present disclosure.

Referring to FIG. 3, illustrated is a flowchart 300 for method of determining a temporal citation count for a document associated with an author, in accordance with an embodiment of the present disclosure. At step 302, a metadata associated with the document is received. The metadata associated with the document is stored in a database arrangement. At step 304, dimensionality reduction techniques are employed on the metadata associated with the document to obtain a state data. At step 306, the author of the document is designated as source node in an entity network comprising information related to a plurality of authors and citation history between the plurality of authors, wherein the remaining authors in the plurality of authors are designated as destination nodes. At step 308, an edge weight for edge between any of the source node and the destination nodes is determined based on the state data. At step 310, the edge weight for the edge between any of the source node and the destination nodes are aggregated to obtain the temporal citation count associated with the published document.

Figure 4:
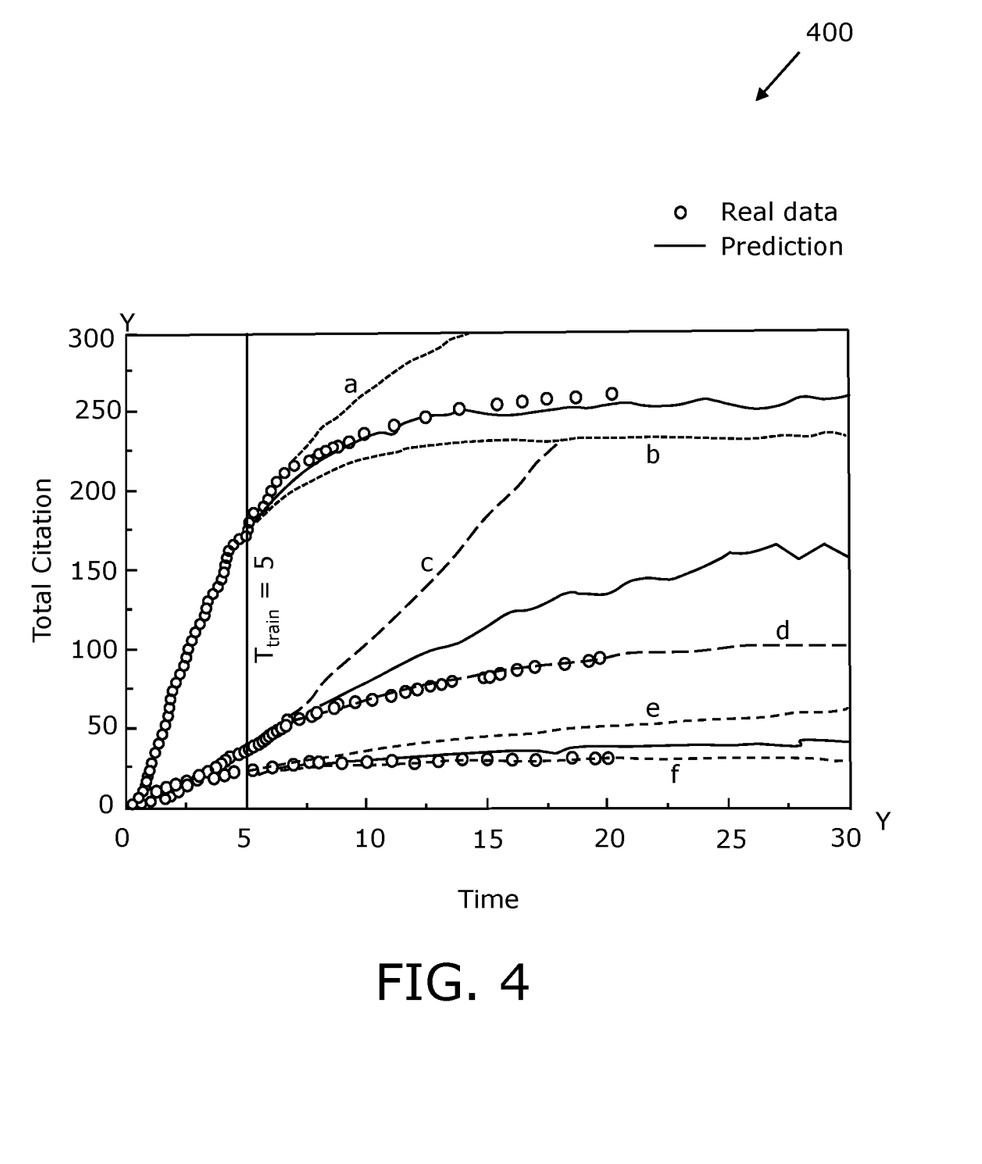
FIG. 4 illustrates a graphical representation of a citation-time graph for representing a temporal citation count of a document, in accordance with an embodiment of the present disclosure.

Referring to FIG. 4, illustrated is a graphical representation of a citation-time graph 400 for representing a temporal citation count of a document, in accordance with an embodiment of the present disclosure. The citation-time graph, on x-axis, includes total number of citations associated with the document and on y-axis includes time in form of number of years. The area between two adjacent dotted lines such as "a and b", "c and d" and "e and f" represents a credible interval for the temporal citation count represented by a solid line within the credible interval. The smaller the credible interval more certain is the temporal citation count. Moreover, a solid line T represents that the temporal citation count is determined based upon an observed citation data of "5 years".

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for determining a temporal citation count for a published document associated with an author, wherein the system comprises a database arrangement storing metadata related to the published document, and a server arrangement communicably coupled to the database arrangement, wherein the server arrangement:
   receives the metadata associated with the published document;
   employs dimensionality reduction techniques on the metadata associated with the published document to obtain a state data;
   designates the author of the published document as a source node in an entity network comprising information related to a plurality of authors and citation history between the plurality of authors, wherein the remaining authors in the plurality of authors are designated as destination nodes;
   determines an edge weight for edge between any of the source node and the destination nodes based on the state data and any of the source and destination nodes associated therewith; and
   aggregates the edge weight for the edge between any of the source node and the destination nodes to obtain the temporal citation count associated with the published document.

2. The system of claim 1, wherein the server arrangement uses an observed citation data having a temporal value, to update the entity network and distribution of nodes within the entity network.

3. The system of claim 2, wherein the entity network and distribution of nodes within the entity network is updated using a backpropagation algorithm.

4. The system of claim 1, wherein the dimensionality reduction techniques are executed via an autoencoder module, wherein the autoencoder module is trained using a variational inference algorithm.

5. The system of claim 1, wherein the metadata related to the published document includes: title of the published document, abstract of the published document, domain of the published document, keywords associated with the published document, date of publication, authors of the published document.

6. The system of claim 1, wherein the entity network is a graph neural network.

7. The system of claim 2, wherein the entity network is optimized using message passing protocol and Adam Optimizer Protocol.

8. The system of claim 1, wherein the temporal citation count is represented on a citation-time graph.

9. The system of claim 8, wherein the citation time graph includes a credible interval.

10. A method of determining a temporal citation count for a published document associated with an author, the method comprises:
receiving a metadata associated with the published document, wherein the metadata associated with the published document is stored in a database arrangement;
employing dimensionality reduction techniques on the metadata associated with the published document to obtain a state data;
designating the author of the published document as a source node in an entity network comprising information related to a plurality of authors and citation history between the plurality of authors, wherein the remaining authors in the plurality of authors as destination nodes;
determining an edge weight for edge between any of the source node and the destination nodes based on the state data and any of the source and destination nodes associated therewith; and
aggregating the edge weight for the edge between any of the source node and the destination nodes to obtain the temporal citation count associated with the published document.

11. A method of claim 10, wherein the method includes using an observed citation data having a temporal value, to update the entity network and distribution of nodes within the entity network.

12. A method of claim 11, wherein the method includes updating the entity network and distribution of nodes within the entity network using a backpropagation algorithm.

13. A method of claim 10, wherein the method includes executing the dimensionality reduction techniques via an autoencoder module, wherein the autoencoder module is trained using a variational inference algorithm.

14. A method of claim 10, wherein the metadata related to the published document includes: title of the published document, abstract of the published document, domain of the published document, keywords associated with the published document, date of publication, authors of the published document.

15. A method of claim 10, wherein the entity network is a graph neural network.

16. A method of claim 10, wherein the method includes optimizing the entity network using messaging passing protocol and Adam Optimizer Protocol.

17. A method of claim 10, wherein the method includes representing the temporal citation count on a citation-time graph.

* * * * *